Patented May 30, 1939

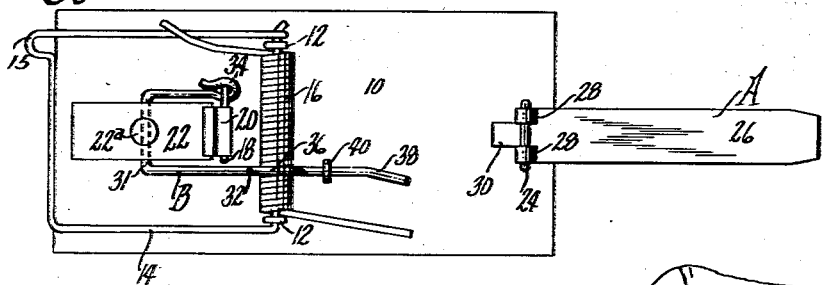
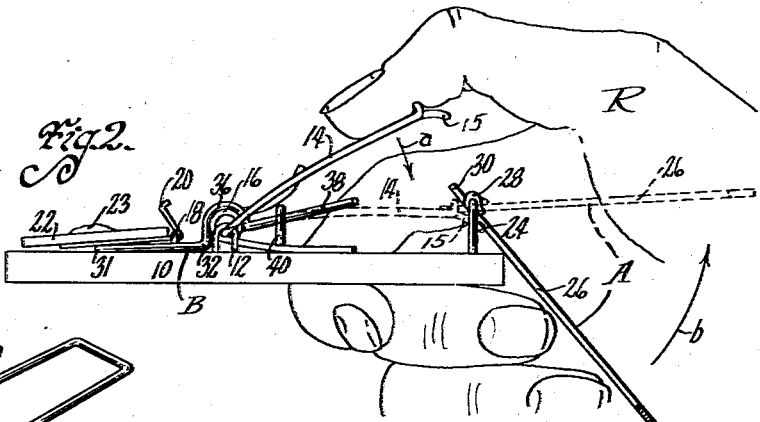
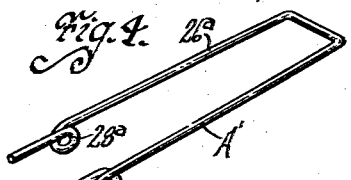
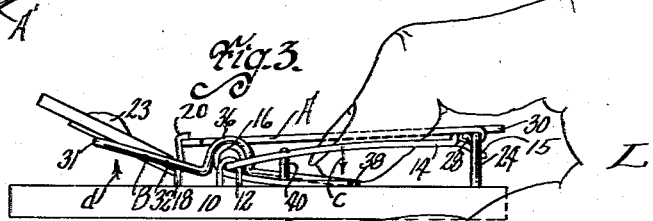
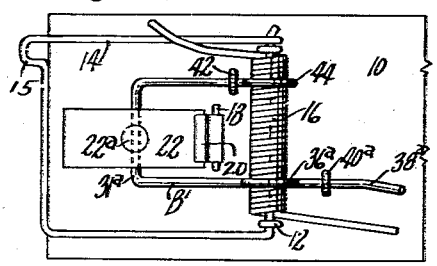
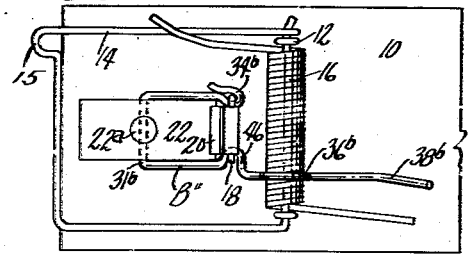

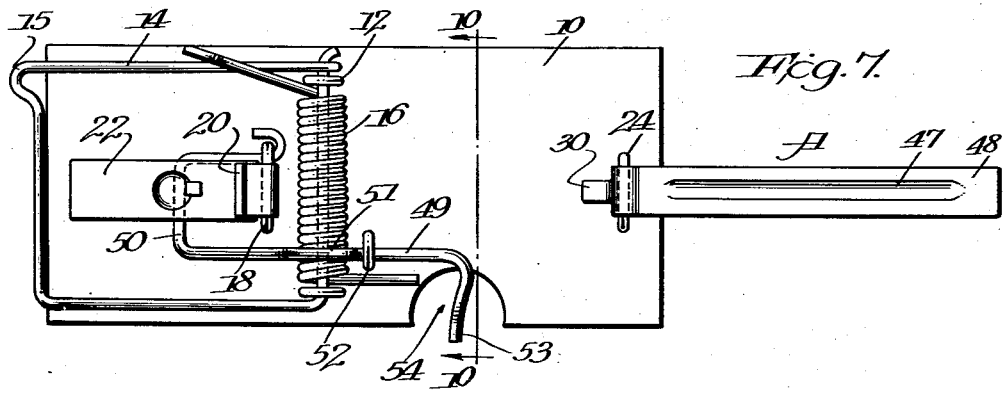
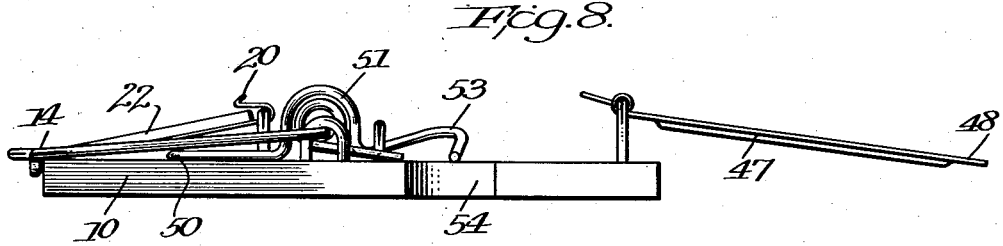
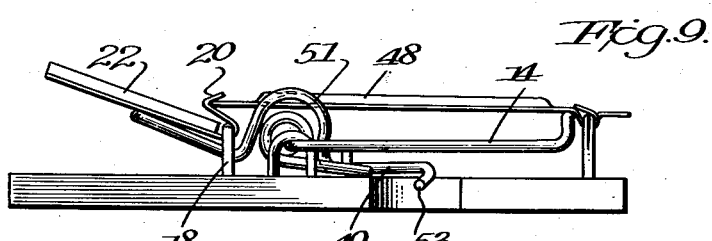
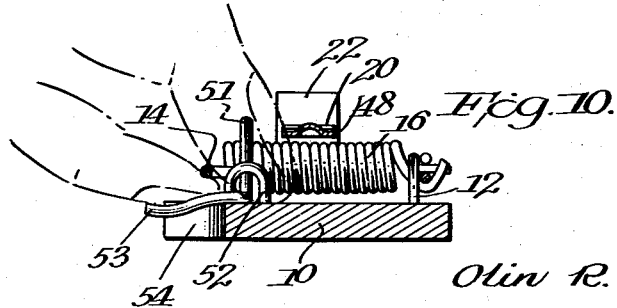

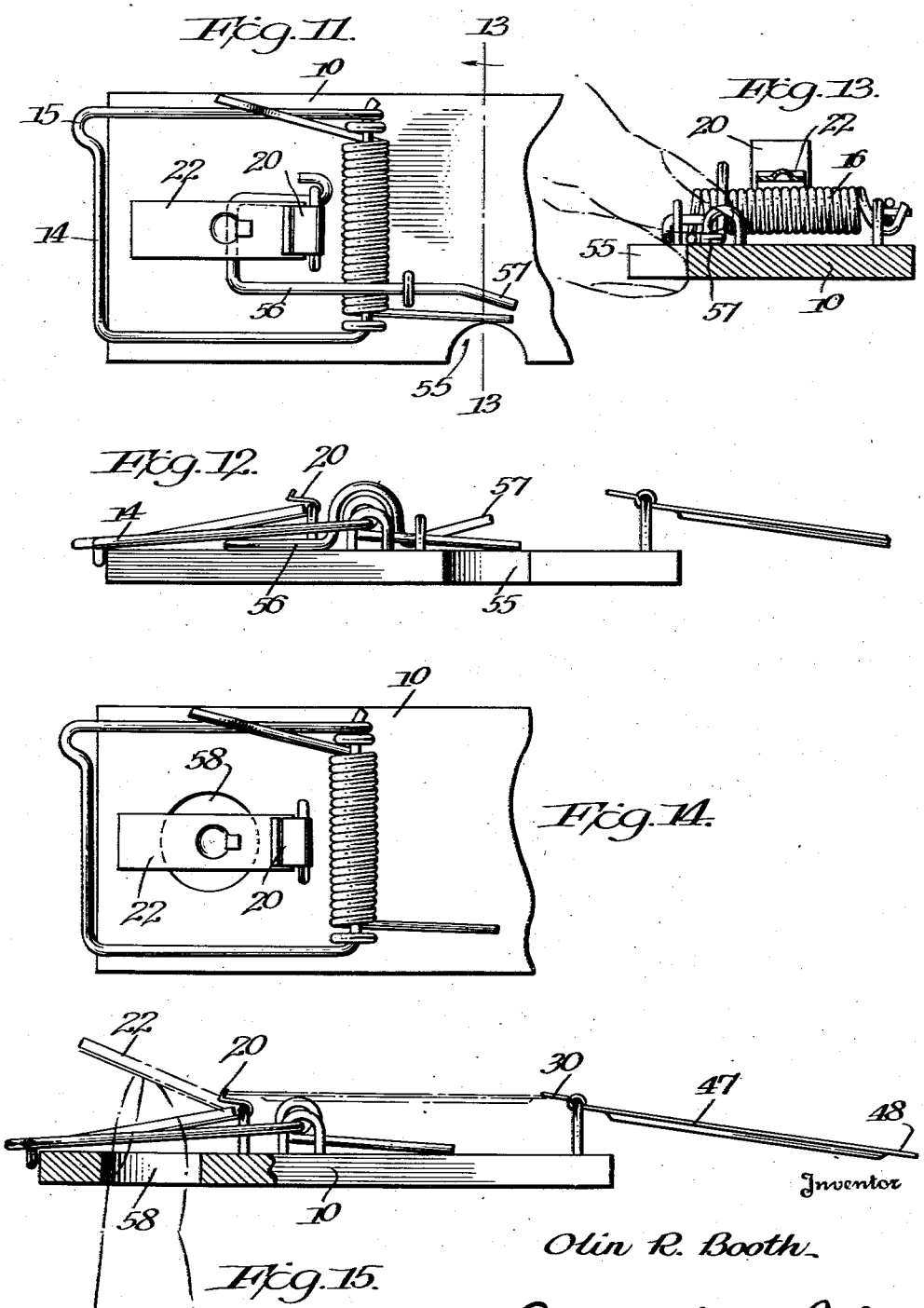

2,160,717

UNITED STATES PATENT OFFICE 2,160,717

MOUSE AND RAT TRAP

Olin R. Booth, Cainsville, Mo.

Application March 12, 1937, Serial No. 130,595

15 Claims. (Cl. 43—81)

The present invention relates to mouse and rat traps and is a continuation in part of my application, Serial No. 721,942, filed April 23, 1934, allowed July 14, 1936.

An object of my invention is to provide a trap for animals, such as mice and rats, having improved construction for setting it and retaining it set, such construction being comparatively simple, durable and inexpensive to manufacture.

A further object is to provide for the ordinary type of mouse trap, a bait bar raising means which is easily operable to positively retain the bait bar is raised position until the trap is finally placed in the position desired.

More particularly, it is my object to provide a bait bar raising means having a depressible portion which can be engaged by the hand of the user which is used to support the trap while placing it in the final position desired.

Another object is to provide a novel type of holder loop retainer for a mouse trap which automatically swings into position to be engaged by the bait bar when the holder loop of the trap is swung to its set position.

With the foregoing and other objects in view, the invention will now be more particularly described, reference being had to the accompanying drawings in which:

Figure 1 is a plan view of a mouse or rat trap embodying my invention.

Figure 2 is a side elevation of the same, showing the parts in one position during setting of the trap.

Figure 3 is a similar view showing the trap fully set and held in the hand of the user.

Figure 4 is a perspective view of a modified form of holder loop retainer.

Figures 5 and 6 are plan views showing modified forms of bait bar raising element.

Figure 7 is a plan view of a further modification of the bait bar raising element.

Figure 8 is a side elevation of the form shown in Figure 7 with the trap in unset position.

Figure 9 is a side elevation of the form shown in Figure 7 with the trap in set position.

Figure 10 is a section taken on line 10—10 of Figure 7.

Figure 11 is a plan view of a still further modification.

Figure 12 is a side elevation thereof.

Figure 13 is a section on line 13—13 of Figure 11.

Figure 14 discloses a plan view of another embodiment of my invention; and

Figure 15 is a side elevation partly in section of the modification shown in Figure 14.

On the accompanying drawings, I have used the reference numeral 10 to indicate a base. The base 10 and parts 12 to 22 which I will now describe are parts of an ordinary mouse or rat trap as at present constructed for commercial production.

The base 10 is usually of wood and has a pair of staples 12 extending upwardly therefrom. A holder loop 14 is pivoted in the staples and constrained to the holding pisition of Figure 1 by a spring 16. A staple 18 is provided on which a latch 20 is pivoted, the latch being secured to a bait bar 22. The bait bar 22 usually has some means for holding bait 23, such as a socket 22a. The holder loop 14 has a lip 15.

I provide a novel form of holder loop retainer A which may be in the form of a strip of sheet metal having a major portion 26, pivot eyes 28 and a tail piece 30. A staple 24 extends upwardly from the base and the eyes 28 are pivoted on the cross piece thereof.

My improvement also includes a bait bar raising element B having a bait bar engaging portion 31 and bent at 32 to extend pivotally over the spring 16, the pivotal portion being indicated at 36.

A portion 38 is retained by a staple 40 and is depressible whereby the portion 36 pivots over the spring 16 and the bait bar engaging portion 31 raises the bait bar 22. As a further means of positioning the element B, it can be provided with an eye 34 associated with the staple 18.

In setting the trap, the first operation is to engage the lip 15 and use it to swing the retainer A to the full line position of Figure 2. The base 10 can then be held in the left hand and the right hand used to swing the loop 14 clockwise to the full line position of Figure 2. The right hand R can then be used as illustrated so that the thumb has leverage to swing the holder loop 14 further as indicated by the arrow a, which will cause the holder loop 14 to engage the tail piece 30 and swing the retainer A as indicated by the arrow b to the dotted line position and then on over so that the terminal end of the portion 26 swings under the latch 20.

The left hand L is then used to depress the portion 38 of the bait raiser element B and to support the trap as shown in Figure 3. This causes the latch 20 to positively retain the holder loop retainer A so that the right hand can then be removed from the trap and the trap is entirely and safely supported in the left hand.

In this position, it can be carried from one room to another and placed on a surface where it is to remain without any danger of being tripped. In placing it on such a surface, it need not be set down carefully as the base 10 can first be engaged with the surface, whereafter the fingers of the left hand can be withdrawn, still causing the thumb engaged with the portion 38 to depress it and thus keep the bait bar safely latched. With the hand in such position, the trap can be slid over the surface if it is desired to change its position and finally the thumb can be lifted from the portion 38 of the raiser element B so that its end 31 will drop, thus leaving the bait bar in position to release the retainer A whenever it is depressed.

From the foregoing description, it is obvious that the position of the portion 38 is quite important. Placed as it is, there is no danger of catching a finger in the trap and this is especially desirable on rat traps which have springs so strong that fingers can be broken by them.

The portion 38 is across the spring 16 from the bait bar 22, the side of the spring on which the bait mar is mounted being the dangerous half of the base 10. The lip 15, by engaging the base 10, serves as a stop in the set position of the trap to prevent the holder loop 14 from getting under the tail piece 30.

Even if the trap is accidentally jarred from the user's hand while holding it as shown in Figure 3 and the bait bar 22 trips, the loop 14 is at the start of its spring urged movement and thus does not have enough momentum to hurt the user's thumb when it strikes it. After it does strike it, the trap will be thrown away from the user's hand so that when it finally closes, it cannot in any conceivable manner catch the hand.

Also, the trap when set down is held as in Figure 3 so that if after releasing it, it should trip, the hand is adjacent the safe half rather than the dangerous half of the base 10.

Another way of carrying the trap after setting it is to engage the edges of the base with the second finger and tumb of either hand and hold the portion 38 of the element B depressed with the forefinger of that hand.

In Figure 4, I have shown a modified form of holder loop retainer. It has been given the reference character A' and has parts similar to the sheet metal type of retainer heretofore described. The various parts of the retainer are given the same reference numerals with the addition of the distinguishing characteristic a.

In Figures 5 and 6, I illustrate modified form of the element B, these elements being indicated by B' and B" in these figures.

The element B' has some parts corresponding to the element B and these are given the same reference numerals with the addition of the distinguishing characteristic a. In addition to these parts, a staple 42 is provided to straddle the element B' instead of the eye 34 for coaction with the staple 18. Also a U-shaped portion 44 and a portion 36a, each similar to the portion 36 of Figure 1 are provided and rest on the spring 16.

In Figure 6, similar parts of the element B" corresponding to the element B are given the same reference numerals with the addition of the distinguishing characteristic b.

In addition to these, a notch-like portion 46 is provided in the element B" to coact with the staple 18 and thus eliminate the staple 40 of Figure 1. The elements B' and B" are provided with portions 38a and 38b, respectively, which are in the same position with respect to the base of the trap as the portion 38 of the element B. As pointed out, the position of this portion is quite important.

Referring now to Figures 7 to 10, there is disclosed another embodiment of my invention, wherein the safety device or bait-raising element is so formed that it may be maintained in operative position entirely clear of or outside the confines of the holder loop. As in the other forms, the trap comprises a rectangular base 10, a holder loop 14 pivoted in staples 12, and a centrally disposed coil spring 16 within which the holder loop is pivoted and which normally retains the loop in the position shown in Figure 7, that is, on the left hand side of the base 10. The bait bar 22 is likewise pivoted to the staple 18 on this side of the spring 16 and is provided with a latch 20 engageable with the free end of the loop retainer A. This latter element is pivotally mounted upon the staple 24 positioned adjacent the right hand end of the base, that is, on the side opposite that upon which the bait holder is mounted. This retainer element is formed of sheet metal of substantial width and is provided with a tail-piece 30. It will be observed that the major portion of the retainer element is provided with a longitudinally extending strengthening rib 47. This rib terminates short of the extreme free end of the retainer to provide a flat, smooth end portion 48 which coacts with the latch 20 to retain the trap in set position.

In this form of the device, the bait bar raising element 49 includes a portion 50 extending under the bait bar and having its extreme end portion connected to the staple 18. The major portion of this element extends substantially longitudinally of the base 10 and is provided with a laterally bent U-shaped portion 51 straddling the spring 16 and constituting means for positioning and pivoting the element upon the base. The element then passes through the staple 52 at a slight incline and is then curved outwardly and downwardly to form a finger engaging end portion 53 which terminates within the confines of one longitudinal edge of the base 10. It will be observed that the base at this point, that is, directly below the portion 53, is cut away to provide a substantially semi-circular notch 54.

With this construction, and assuming that it is desired to set the baited trap, the latter is initially held in the left hand of the operator. The operator then grasps the lip 15 with the thumb and forefinger of his right hand and moves the holder loop about its pivot against the tension of the spring 16 until it travels the full half circle and contacts with the other side of the base. The end of the loop will, as in the other modifications, engage the tail piece 30 and swing the loop retainer about its pivot so that its extreme free end will engage the latch 20 of the bait bar. The left hand may then be removed from the base of the trap to permit the thumb and forefinger of this hand to be free to actuate the handle portion 53 of the safety device.

With the palm of the left hand turned upwardly, the forefinger is inserted into the notch 54 between the holder loop 14 and the end portion 53 of the safety device, that is, the fingernail of the forefinger will bear against the end portion 53. At the same time, the thumb will engage the base within the holder loop as shown in Figures 9 and 10. The fingers of the right hand may then be disengaged from the trap, as it will now be securely held with the safety device in operative position. The pressure of the thumb on the base will effect a slight wedging action of the forefinger between the end portion 53 and the loop 14 which will permit the trap to be moved about without any danger of the safety device being released. It will be observed that no portion of the left hand is beneath the base, thus permitting the trap to be laid upon a flat surface without the necessity of removing one or more fingers. After the trap has been deposited, the thumb may then be removed from the base, with the forefinger still in engagement with the end portion 53. This finger may then be removed and the safety device released. If the trap is accidentally jarred during this last operation, the hand is entirely on the outside of the holder loop, thus eliminating all danger of the loop striking the fingers and thumb.

Referring now to Figures 11 to 13, there is disclosed another form of my invention which is somewhat similar to that disclosed in Figures 1 to 3. In this embodiment, the base 10 is provided with a substantially semi-circular notch 55 and the finger engaging end 57 of the bait bar raising element 56 terminates within the areas of the holder loop when set and on a line with the notch 55.

To set the trap, the same operations are carried out as that above described with respect to the form illustrated in Figures 7 to 10 up to the point where the left hand is released from the base of the trap. While the thumb and forefinger of the right hand are still holding the holder loop in its operative position, the thumb and forefinger of the left hand will engage the portion 57 and the notch 55, as shown in Figure 13, that is, the thumb will directly engage and depress the portion 57 to the base while the forefinger will be received in the notch 55 and coact with the thumb to retain the safety element in operative position, at the same time, permitting the base to be securely grasped without the necessity of placing one or more fingers under the base. By grasping the trap in this manner, it may be easily and quickly moved from one position to another and deposited upon a flat surface without the necessity of withdrawing one or more fingers from under the base.

It will be observed from a review of Figures 7 to 13 that the U-shaped portion 51 of the bait raising element is illustrated as not snugly engaging the spring 16, as is shown in Figures 1 to 6 of the drawings. Furthermore, the right hand leg of this U-shaped portion substantially rests upon the base 10. This arrangement does not necessitate as fine an adjustment of the safety element to the spring during manufacture and facilitates quantity production. At the same time, none of the effectiveness of the operation of the device is lost, as the combination of the U-shaped portion 51 and the spring still cooperate to provide a positioning and pivoting means for the safety element upon the base 10.

In Figures 14 and 15, I have disclosed a further modification of my invention wherein the base 10 is provided with a finger engaging aperture 58 positioned directly beneath the bait holder 20. The latch 22 is adapted to coact with the tail piece 30 of the retainer loop, and, as in the form shown in Figures 7 to 12, the retainer element is provided with a strengthening rib 47 which terminates short of the extreme free end 48 thereof.

The combination of the aperture 58 with the retainer element having the tail piece 30 provides a certain coordination in the setting of the trap which is absent in the usual type of trap having the ordinary wire loop holder, even if such trap is provided with an aperture below the bait holder. In setting this latter type of trap, it is necessary to first bring the holder loop over to the opposite side of the base, then grasp the wire retainer element and swing it over the loop to a position adjacent the bait holder, and finally raise the bait holder to permit the latch 20 to engage the free end of the retainer.

With the present arrangement, however, it is merely necessary for the operator to grasp the base of the trap in the left hand with the forefinger projecting through the aperture and in position to easily raise the bait holder. The holder loop may then be easily and quickly moved about its pivot by the thumb and forefinger of the right hand. When the loop nears the end of its movement toward the other side of the base, it will engage the tail piece 30, and automatically swing the retainer element about its pivot, so that the free flat end thereof will move to its final position to engage the latch 20. At the same time, the forefinger of the left hand will have raised the bait holder to the position where the retainer will easily engage the base of the latch and it will then merely be necessary for the operator to further raise the bait holder to latch the retainer element in operative position. It will thus be apparent that this combination of elements greatly facilitates the setting of this type of trap in that it eliminates a number of awkward operations which are necessary with the prior art types of traps.

By providing the loop holder with the reinforcing rib extending longitudinally of the retainer, this element is substantially reinforced and gives to the retainer the further function of stunning or killing the animal should it attempt to take the bait from the far side of the bait holder. Thus, in all of the forms of my construction, the trap is capable of a double action, that is, killing or at least stunning the animal from either side of the base.

With respect to the forms shown in Figures 7 to 10 and 11 to 13, it will be apparent that both the safety device and notch may be positioned on either side of the trap and that they will function efficiently at either position. Furthermore, the aperture 58 illustrated in Figures 14 and 15 may be utilized for hanging the trap on a display stand or other support. In this connection, the lip 15, shown in all forms, may also be used for this purpose.

It is to be understood that the term "finger engaging" as used in the claims is to be broadly construed to include the thumb as well as any of the fingers of a person's hand. It will be further understood that the invention is not limited to the details of construction shown in the drawings and that the examples of the use of the devices which have been given do not include all of the uses of which they are capable, and that the phraseology employed in the specification is for the purposes of description and not of limitation.

I claim:

1. For a trap of the kind having a rectangular base, a central spring, a holder loop pivoted therein, a bait bar extending adjacent said central spring, longitudinally of the base and toward one end thereof and a loop retainer extending from the bait bar toward the opposite end of the base, means for raising said bait bar comprising an element centrally pivoted, having one end under said bait bar and its other end located between said central spring and said opposite end of said base and between said loop retainer and one side edge of said base.

2. For a trap of the kind having a rectangular base, a central spring, a holder loop pivoted therein, a bait bar extending from adjacent said central spring, longitudinally of the base and toward one end thereof and a loop retainer extending from the bait bar toward the opposite end of the base, an element having a thumb engageable portion located between said central spring and said opposite end of said base and between said loop retainer and one side edge of said base and cooperating with said bait bar to raise it when said portion is depressed.

3. For a trap including a base, a spring, a holder loop actuated thereby and a bait bar on the base and located on one side of the spring, bait bar raising means comprising an element pivotally associated with said base intermediate the ends of the element, one end of the element being located under said bait bar and the other end thereof being located above said base on the opposite side of said spring, and within said holder loop when said trap is in set position.

4. For a trap including a base, a spring, a holder loop actuated thereby, and a bait bar on the base and located on one side of the spring, bait bar raising means comprising an element, and means for positioning and pivoting said element relative to said base with one end thereof associated with said bait bar for raising it when the other end thereof is depressed, said other end being located on the opposite side of said spring, and within said holder loop when said trap is in set position.

5. For a trap of the kind having a rectangular base, a central spring, a holder loop pivoted therein, a bait bar extending from adjacent said central spring, longitudinally of the base and toward one end thereof and a loop retainer extending from the bait bar toward the opposite end of the base, a lip on the outer end of said loop to facilitate setting of said trap, and means for raising said bait bar comprising an element centrally pivoted, having one end under said bait bar and its other end located within the area defined by said central spring, said opposite end of said base, said loop retainer, and one side of said base.

6. For a trap of the kind having a rectangular base, a central spring, a holder loop pivoted therein, a bait bar extending from adjacent said central spring, longitudinally of the base and toward one end thereof and a movable loop retainer extending from the bait bar toward the opposite end of the base, an element having a thumb engageable portion located within the area defined by said central spring, said opposite end of said base, said loop retainer and one side of said base, said portion being within said holder loop when the trap is set, said element cooperating with said bait bar to raise it when said portion is depressed, said loop retainer having a tail piece adapted to be engaged by said holder loop for thereby swinging said loop retainer toward said bait bar setting of the trap, said holder loop and tail piece being so related that momentum of the movable retainer completes such swinging.

7. For a trap of the kind having a rectangular base, a central spring, a holder loop pivoted therein, a bait bar extending from adjacent said central spring longitudinally of the base and toward one end thereof, and a loop retainer extending from the bait bar toward the opposite end of the base, means for raising said bait bar comprising an element operatively connected therewith and having a portion which upon being depressed raises said bait bar, said portion being located between said central spring and said opposite end of said base and within the outline of said loop.

8. A trap including a base, a spring, a holder loop actuated thereby and a bait bar on the base and located on one side of the spring, bait bar raising means including an element having a portion thereof extending substantially longitudinally of the base and overlying said spring and having means for positioning and pivoting said element on said base at said spring, with one end of said element associated with said bait bar for raising it when the other end thereof is depressed, said other end being located on the opposite side of said spring and constituting a finger engaging operating handle.

9. A trap including a base, a central spring mounted transversely of the base, a holder loop actuated by said spring, a bait bar mounted on said base and located on one side of said spring, bait bar raising means including an element having a portion thereof extending longitudinally of the base and provided with an offset bent portion straddling the spring and constituting a pivot for said element, with one end thereof associated with said bait bar for raising it when the other end is depressed, said other end being located on the opposite side of the spring and constituting a finger engaging operating handle.

10. A trap including a base, a spring, a holder loop actuated thereby and a bait bar on the base and located on one side of the spring, bait bar raising means including an element having a portion thereof extending substantially longitudinally of the base and overlying said spring, and means for positioning and pivoting said element on said base at said spring, with one end of said element associated with said bait bar for raising it when the other end thereof is depressed, said other end being located on the opposite side of said spring and extending laterally outwardly beyond the confines of the holder loop whereby said bait raising means may be held in operative position exteriorly of said holder loop.

11. A trap including a base having a cutaway portion on one side forming a notch, a spring, a holder loop actuated thereby, and a bait bar on the base and located on one side of the spring, bait bar raising means comprising an element, and means for positioning and pivoting said element relative to said base with one end thereof associated with said bait bar for raising it when the other end thereof is depressed, said other end being located on the opposite side of said spring and projecting into the area defined by the notch whereby said bait raising means may be held in operative position exteriorly of said holder loop.

12. A trap including a base having a cutaway portion in one side forming a notch, a spring, a holder loop actuated thereby and a bait bar on the base and located on one side of the spring, bait bar raising means including an element having a portion thereof extending substantially longitudinally of the base and overlying said spring, and means for positioning and pivoting said element on said base at said spring, with one end of said element associated with said bait bar for raising it when the other end thereof is depressed, said other end being located on the opposite side of said spring and projecting laterally outwardly into the area defined by the notch whereby said bait raising means may be held in operative position exteriorly of said holder loop.

13. A trap including a base having a cutaway portion in one side forming a notch, a spring, a holder loop actuated thereby, and a bait bar on the base and located on one side of the spring, bait bar raising means comprising an element, and means for positioning and pivoting said element relative to said base with one end thereof associated with said bait bar for raising it when the other end thereof is depressed, said other end being located on the opposite side of said spring and within said holder loop when said trap is in set position, said notch facilitating grasping of the base without placing the fingers beneath the base.

14. A trap including a base, a spring, a holder loop actuated thereby and a bait bar on the base and located on one side of the spring, bait bar raising means including an element having a portion thereof associated with said spring for positioning and pivoting said element on the base, said element having a second portion connected to the first mentioned portion and engaging said bait bar, and a finger engaging portion positioned on the opposite side of the spring from the bait bar engaging portion and cooperating therewith to raise the bait bar when the finger engaging portion is depressed.

15. A trap including a base, a spring, a holder loop actuated thereby and a bait bar on the base and located on one side of the spring, bait bar raising means including an element comprising a wire having a portion thereof extending substantially longitudinally of the base and having an offset bent portion straddling the spring for positioning and pivoting said element on said base at said spring, said wire having a portion connected to the longitudinal portion and bent to extend under and engage the bait bar, said wire having a finger engaging portion positioned on the opposite side of the spring from the bait bar engaging portion and cooperating therewith to raise the bait bar when the finger engaging portion is depressed.

OLIN R. BOOTH.